United States Patent [19]

DiOrio et al.

[11] Patent Number: 4,569,019

[45] Date of Patent: Feb. 4, 1986

[54] VIDEO SOUND AND SYSTEM CONTROL CIRCUIT

[75] Inventors: David W. DiOrio, Easton; Bruce F. Ahrens, Phoenixville; Robert J. Raible; Chaoynan E. Yang, both of Audubon, all of Pa.

[73] Assignee: Commodore Business Machines Inc., West Chester, Pa.

[21] Appl. No.: 500,996

[22] Filed: Jun. 3, 1983

[51] Int. Cl.[4] .................... G06F 15/44; G06F 3/153
[52] U.S. Cl. .................................. 364/410; 364/521; 364/900; 364/513.5; 358/903
[58] Field of Search .................. 364/400, 410, 513.5, 364/200 MS File, 900 MS File, 521; 273/DIG. 28; 358/903; 381/51, 53; 340/720, 723, 732

[56] References Cited

U.S. PATENT DOCUMENTS

| | | | |
|---|---|---|---|
| 3,158,685 | 11/1964 | Gerstman et al. | 364/513.5 X |
| 4,053,740 | 10/1977 | Rosenthal | 364/410 X |
| 4,180,805 | 12/1979 | Burson | 364/200 X |
| 4,296,476 | 10/1981 | Mayer et al. | 364/900 |
| 4,344,148 | 8/1982 | Brantingham et al. | 364/513.5 X |
| 4,445,187 | 4/1984 | Best | 364/410 X |
| 4,471,464 | 9/1984 | Mayer et al. | 364/900 |
| 4,475,228 | 10/1984 | Vickers | 364/410 X |

*Primary Examiner*—Gary V. Harkcom
*Attorney, Agent, or Firm*—John J. Simkanich

[57] ABSTRACT

Programmable I/O (input/output) interface circuitry provides video and audio signals, needed for a video computer/game, to a commercial color television type display/monitor and may be implemented in HMOS, (H type metal oxide semiconductor) large-scale-integrated circuitry. The system architecture allows for reduced chip count, and improved reliability while providing adequate synchronization pulses, luminance level signals, chrominance phase shift signals, raster control and cursor control video and three independently controlled audio voices. A software selectable keyboard latch input, plural speed processing for faster operation when outside the active display area or during blanking, all system control signals necessary for system operation and 3 independently controlled interrupt generating timers are also provided.

7 Claims, 3 Drawing Figures

VIDEO SOUND AND SYSTEM CONTROL CIRCUIT

BACKGROUND OF THE INVENTION

This invention relates to video and audio interface circuitry for video processors and specifically to such circuitry which interprets software instructions from function defining software to generate video and audio display information.

Video game processors as well as video and audio interface circuitry are more marketable and more desirable when they are smaller, use less power and are less expensive to manufacture than their competing circuits. As processors have generally more universal function, microprocessor development has progressed into NMOS large scale integration (LSI) circuitry more rapidly.

Video and audio interface circuitry, being more specific to the particular application, i.e., to the particular specifications of the device, have developed in the area of miniaturization and inexpensive implementation less slowly.

As a result, much of low cost computer/video game circuitry costs are attributed to video and audio interface circuitry which "interprets" the game program or "text". As the features incorporated into this interface circuitry increase and multiple standards (such as National Television Systems Committee ["NTSC"] and PAL) are applied, costs of manufacture increase.

SUMMARY OF THE INVENTION

An object of the present invention is to provide a low cost computer/video game circuit with keyboard input capability.

A second object is to minimize system configuration while still providing a 40 by 25 full color character mode, a bit mapped mode and several enhancements of each.

A third object is to provide basic sound capabilities using three oscillators.

A further object is to provide higher speed processor throughput during nonactive display.

A further object is to provide all necessary memory control signals for dynamic RAM's and 2 static ROM's.

An even further object is to provide a circuit architecture which enables a reduced chip count/cost, and increasing system reliability.

The objects of this invention are realized in a video display/system controller (programmable I/O interface circuitry) for a computer/video game circuit containing but 9 integrated circuits (IC's): a microprocessor chip, a pair of read only memory (ROM) chips, a pair of random access memory (RAM) chips, a pair of low power Schottky driver chips, a TTL inverter pack and a video/audio interface chip.

This video/audio interface chip can be implemented by a custom 48-pin LSI (Large scale integrated) circuit utilizing NMOS (N type metal oxide semiconductor) or HMOS (H type metal oxide semiconductor) technology. The other chips can be obtained commercially.

The interface chip performs text and signal managing functions to generate all of the video color and audio information necessary to meet NTSC/PAL (National television standard/European television) standards. All of the commercial chips and the video display/system controller can perform 8-bit word (parallel) processing.

The video section of the video display/system controller generates synchronization pulses, luminance levels, chrominance phase shift signals, a cursor location signal, refresh signals, a raster control signal and keyboard latch software selectable.

A two-speed clock allows for faster processing of horizontal video information than vertical video information. A border region sensor allows for the processing of vertical video information at the border regions of the display at the faster processing speed.

Three software settable frequency base registers provide three clock times for three oscillators. Of these, two oscillators are dedicated to square wave signals and the third is selectable between a square wave and white noise. A separate register, which is software settable, selects a voice and volume (signal limited) from a combination of the three oscillator outputs.

A software implemented freeze bit temporarily stops a faster processing time counter for synchronizing the text editor chip with a VCR (television).

DESCRIPTION OF THE DRAWINGS

The features, advantages and operation of the invention will be better understood from a reading of the following detailed description with the accompanying drawings in which like numerals refer to like elements, and in which.

DETAILED DESCRIPTION

Figure 1:
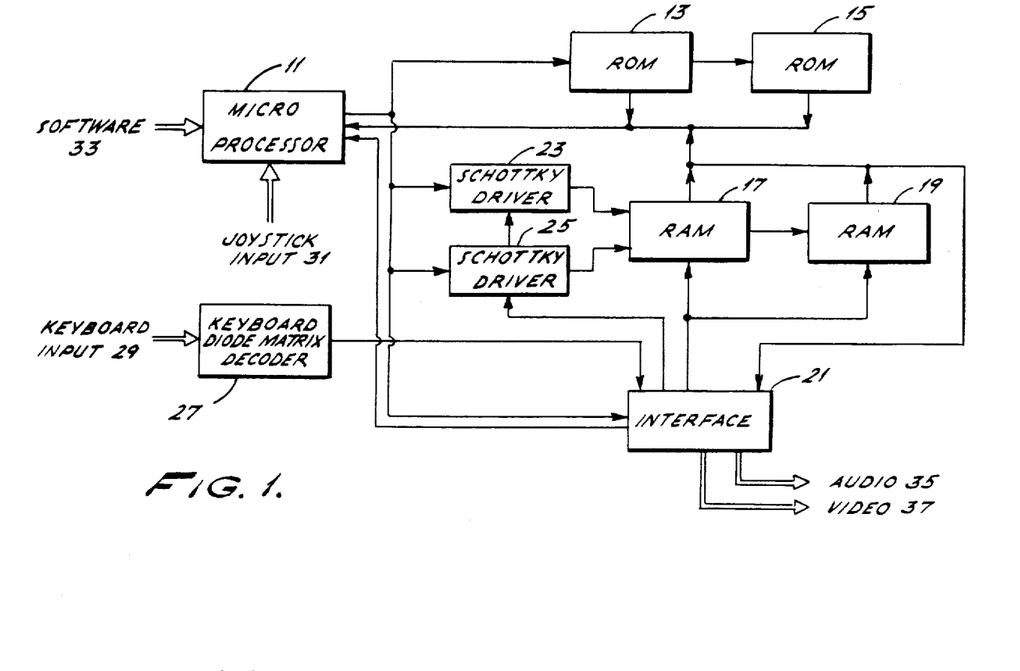
FIG. 1 is a block diagram of the system comprising the computer/video game circuit of the invention.

A computer/video game system circuit, FIG. 1, can be implemented with 9 integrated circuits (IC's). The system includes a microprocessor 11 which can be implemented by a commercially available microprocessor chip, such as a Model 6510 microprocessor of Commodore MOS Technology, Norristown, Pa. A pair of read only memories 13, 15 are connected to receive address from the microprocessor 11 and send data (or address information) back to the microprocessor 11. Each read only memory (ROM) 13, 15 can be implemented by commercially available chips, such as Commodore MOS Technology Model 23128, 16K, 8-bit ROM's.

A pair of dynamic random access memories 17, 19 are also incorporated into the system. These memories 17, 19 are connected to transfer information to the microprocessor 11 as well as to a programmable I/O interface circuit 21, which operates as a video display/system controller. These random access memories (RAM's) 17, 19 can be implemented with commercially available chips such as Texas Instruments, Dallas, Tex., Model TMS4416, 16K, 4-bit RAM's, or alternately Intel Corp. Model 2164.

A pair of Schottky type driver circuits 23, 25 are connected to drive the RAM's 17, 19 under address connections from the microprocessor 11 and control and address connections from the interface circuit 21. These Schottky drivers 23, 25 are commonly available in the marketplace from many suppliers including Texas Instruments Incorporated. A diode matrix type decoder 27 interfaces an operator keyboard input 29 and the interface circuit 21. A joy stick input 31 directly connects to the microprocessor 11. Program software 33 is input into the system through a connection to the microprocessor 11 as controlled by the interface circuit 21.

Interface circuit 21 provides both audio 35 and video 37 output signals to a display device.

The system architecture of FIG. 1 is made possible by the design and operational parameters incorporated into the interface circuit 21, which is a "smart" input-output (I/O) device generating both audio and video signals as well as system control signals. The relatively slow speed requirements of a commercial television (display) with respect to the processing capabilities of the NMOS or HMOS LSI circuitry components permits multiplexing operations, utilizing the available duty cycle of the circuit components while reducing the number of circuit components needed.

In addition to lowering the manufacturing cost (with a lower chip count) and the power requirements of the system, noise problems involved when data is transferred between chips are reduced and redundant circuitry is minimized.

Figure 2:
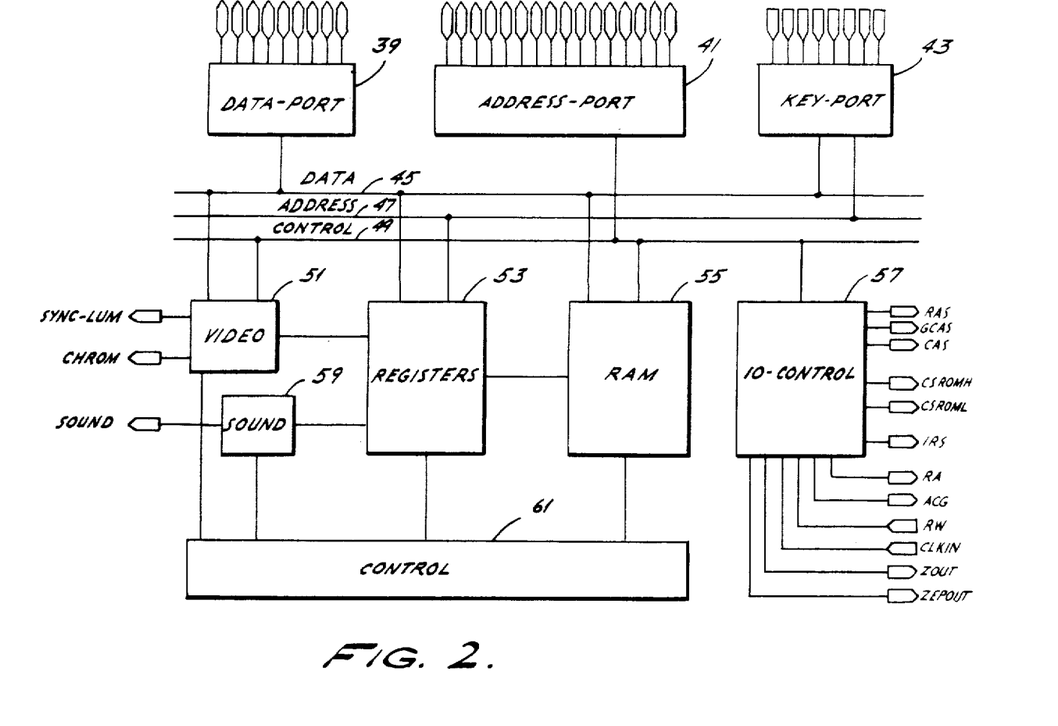
FIG. 2 is a function block diagram of the diagram for the interface circuit of FIG. 1.

FIG. 2 shows the interface circuit 21 (chip) of FIG. 1 in a functional block diagram as opposed to a structural diagram. The interface circuit 21 functions to provide a data port 39, an address port 41, and a keyboard port 43. Interconnection lines within the chip carry data information 45, address information 47 and control signals 49 between a video section 51, operational registers 53, internal memory 55, and the I/O control section 57. Operational registers 53 are also connected to a sound section 59. A control section 61 connects with the memory 55, the operational registers 53 and the sound 59 and video 51 sections.

Various outputs which can be adjusted to meet either NTSC or PAL standards are provided by the video section 51, the sound section 59 and the interface control section 57.

The chip includes a crystal oscillator for driving the basic clock. By switching crystals, the system can be used with European television standards (PAL) instead of NTSC. This switchover to PAL includes an adjustment of memory reset pointers which keep track of functional time sequences.

Figure 3:
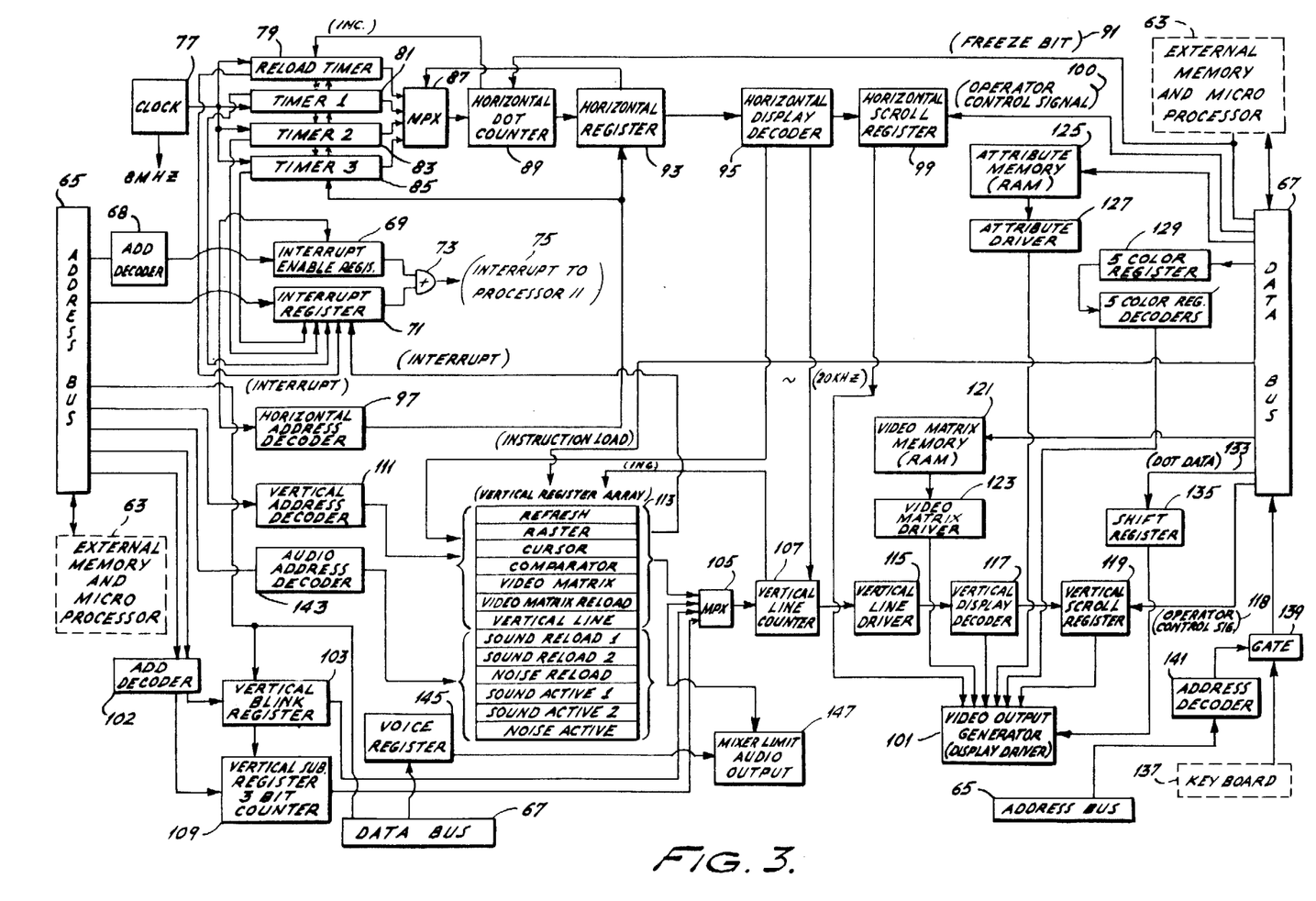
FIG. 3 is a structural implementation block diagram of the interface circuit of FIG. 1.

The interface circuit 21 of FIG. 1 can be structurally implemented as shown in FIG. 3. Implementation can be by NMOS or HMOS technology using LSI techniques. The ROM's 13, 15 and RAM's 17, 19 and the microprocessor 11 of FIG. 1 are external to this chip and are represented as external memory and microprocessor block 63, which communicates in both directions with an address bus 65 and a data bus 67 on the chip. An interrupt enable register 69 is software loadable from the data bus 67 under an address from the address bus 65 via an address decoder 68. An interrupt register 71 is loaded from separate interrupt sources, i.e., each of the timers 79, 81, 83, 85 and the raster register of array 113, described below.

The output from the interrupt enable register 69 and the interrupt register 71 is passed through an AND 73 to provide an interrupt signal 75 to the processor 11.

A crystal oscillator clock 77 supplies pulses to a reload timer 79 and three other individual timers 81, 83, 85 which count down the basic clock 77 pulses into desired frequencies. This clock 77 provides an approximate 8 MHz signal for horizontal location drive processing and other clocks which are generated throughout the circuit as described below.

Multiplexing is a commonplace design consideration of the architecture (interface 21, FIG. 3) including intracomponent connections and address bus 65 and data bus 67 communication. Shown in FIG. 3 is the multiplexor 87 which feeds the timer 79, 81, 83, 85 outputs to a horizontal dot counter 89. Such multiplex components are understood to need not always be shown as part of the FIG. 3. The multiplexing functions, whereby various counters in the chip 21 (FIG. 1) are time multiplexed, are possible because the speed of the chip 21 (FIG. 1) is much faster than the video display. Because the ultimate output of the computer/video game system is to drive a commercial television receiver, the very fast processing times which normally occur in NMOS LSI circuitry are not needed, and alternately multiplexing is incorporated to reduce architecture size by taking advantage of multiplexing principles. Horizontal dot counter 89 provides a feedback or increment signal to each of the timers 79, 81, 83, 85.

A software settable freeze bit 91 from data bus 67 connects to inhibit the horizontal dot counter 89 and can be released in synchronism with the VCR to synchronize the chip 21 (FIG. 1) to the VCR (display).

Horizontal counter 89 feeds a horizontal register 93 which in turn drives a horizontal display decoder 95. A feedback connection is made from the horizontal register 93 to the multiplexor 87.

A horizontal address decoder 97 is software loaded from the address bus 65 and feeds the horizontal register 93 as well as each of the timers 79, 81, 83, 85.

A horizontal scroll register 99 receives information from the horizontal display decoder 95 as well as an operator control signal 100 from data bus 67 in the form of a software instruction. The output of the horizontal scroll register 99 is fed to a video output generator 101 which is a display driver for driving the color television display.

A vertical blink register 103 is software selectably loaded from the data bus 67 under control of address-decoder 102 connected to address 65, to initiate a 2 Hz display flash. The output of this vertical blink register 103 is connected through a multiplexor 105 to a vertical line counter 107.

The vertical line counter 107 also receives another input via the multiplexor 105 from a vertical subregister 109 which is loaded from the data bus 67 controlled by an address decoder 102 which is connected to address bus 65.

A vertical address decoder 111 receives address instructions from the address bus 65 and provides an output to a vertical register array 113. Horizontal display decoder 95 also provides an output to the vertical register array 113. This array 113 contains 13 registers, one register each for the following functions: refresh, instantaneous raster line location, cursor location, raster comparison, video matrix location, video matrix reloading (recirculating), vertical line location, noise oscillator reloading, and noise oscillator active. It also contains two registers for each of the following functions: sound oscillator reloading and sound oscillator active.

The output from the vertical register array 113 is connected to the vertical line counter 107 through the multiplexor 105. Vertical line counter 107 feeds a vertical line driver 115 which in turn drives the vertical display decoder 117. An approximate 20 KHz (incrementing) connection exists from horizontal decoder 95 to the vertical connector 107.

An operator control signal 118, which is software instruction implemented, is fed to a vertical scroll register 119 from data bus 67. Vertical scroll register 119 also receives information from the vertical display decoder 117 and provides an output to the video output generator 101.

A video matrix memory (RAM) 121 receives data from data bus 67.

Video matrix memory (RAM) 121 feeds a video matrix driver 123 which in turn provides an input to the video output generator 101. The most significant bit of the RAM 121 can be utilized as a single bit video selection. Reverse video selection causes a negative video display.

An attribute memory (RAM) 125 is connected to the data bus 67. The information from this attribute memory 125 is fed to an attribute driver 127 which in turn provides an input to the video output generator 101.

Five registers 129 for holding color information are connected to the data bus 67. Each of the color registers 129 is connected to feed into a respective one of five color register decoders 131. The output from each of the color register decoders 131 is input to the video output generator 101.

Dot data 133 is transferred from data bus 67 to a shift register 135 and then into the video output generator 101.

Input from an operator external keyboard 137 is latched via a gate 139. This gate 139 is enabled by a signal from an address decoder 141 which is loaded from the address bus 65.

All internal timing is derived from the clock 77, which operates at 14.3 Mhz. This clock 77 is divided down in a synchronous manner to obtain the following major clock signals: 7.15 MHz, 3.58 MHz, 1.79 MHz and 894.89 KHz. Also provided are the inverse of each of the clock pulses so that there are pulse pairs of non-overlapping clock pulses.

The attribute memory 125 stores 8 bytes of information in three fields, the first field being 4 bits defining 16 colors, the second field being 3 bits defining 8 luminance levels and the third being a single bit being 2 Hz flash selection. By using the 16 basic colors and the 8 luminance levels, a total of 128 color combinations may be generated.

The cursor register in the vertical register array 113 contains one bit for each location on the screen wherein there are a thousand possible locations on a 25-row by 40-column television screen. This register is updated by software as often as every cycle and contains a stored location for the instantaneous character location.

The refresh register of the array 113 is dedicated to a refresh function for the dynamic RAM's 121, 125.

The video portion of the interface circuit 21 provides a dynamic RAM refresh, raster comparison, screen blanking (scroll), a 40×25 character display, software reset, 16 basic colors, 8 luminance levels, selectable reverse video and a selectable 2 Hz flashing operation. All functions are software-resettable. Sound generation is also accomplished to provide an audio output.

The horizontal video architecture including the counter 89, the register 93 and the decoder 95 are driven at the faster clock rate of approximately 8 MHz. The vertical video architecture including the vertical register array 113, the vertical counter 107 and the vertical line driver 115 are driven at the slower clock-rate of about 17-20 KHz (period of 63 microseconds).

The horizontal scroll register 99 and the vertical scroll register 119 when incremented permit the border to be moved inward from the edge of the display in such increments.

The vertical register timing is controlled by the output from the horizontal display decoder 95 to the vertical register array 13.

The value loaded into the vertical sub-register 109 reflects the raster line of the character row. This is a 3-bit counter which contains vertical character 8×8 matrix information.

Color and luminance data is stored in the attribute memory 125 while pointer data is stored in the video matrix memory 121.

The vertical register array 113 is loaded via the data bus 67, FIG. 3. This array 113 contains vertical video information as well as audio information. While the vertical address decoder 111 controls the video portion of the array 113, a separate audio address decoder 143 connected to the address bus 65 controls the loading of the audio portion of this array 113. This array 113 is driven by the slower clock which is utilized via the audio register to provide three oscillator outputs, thereby generating a first and second square wave "voice", and a third "voice", selectable between square wave or white noise.

A voice register 145 is connected to the data bus 67. This voice register feeds a mixer-limiter 147 which provides the audio output by selecting any one or all of the three oscillator outputs from the array 113 and controlling volume level. Voice register 145 has two 4-bit fields, one of which is dedicated to oscillator selection and the other dedicated to volume level selection. Various operational features of the invention are as follows:

CLOCKS: All internal timing is derived from the 14.31818 MHz clock input. This input clock is divided down in a synchronous manner to obtain the following major clock signals: $\Phi$ 1 video and $\Phi$ 2 video (7.15 MHz), $\Phi$ 1 system and No. 2 system (3.57 MHz), No. 1 memory and No. 2 memory (1.7897725 MHz), and $\Phi$ 1 processor and $\Phi$ 2 processor (894.88 KHz). These clock pairs are non-overlapping and the corresponding rising and falling edges should all occur within 3 nanoseconds of each other. The video clocks are used to drive an 11-bit horizontal dot counter 89 and a 9-bit "slow" counter 107. The lower 9 bit outputs of the horizontal dot counter 89 drive a decoder array 95 whose outputs control all aspects of the video signal generation via array 113 including dynamic memory access operations and normal memory operations.

The counter 89 is designed to count 456 full (video clock) cycles or dots, since the video clocks are also used to shift the dot information to the color generation circuitry. The horizontal counter 89 counts 456 dots; 0 to 455 then back to 0. This provides a horizontal line rate of 63.69 microseconds. One of the functions of the slow counter 107 is to increment the value in the vertical line register 113. The outputs from this register 113 are used to drive the vertical timing decoder 117. The slow counter 107 and vertical line register 113 are under control of the horizontal timing decoder 95. These control lines are programmed such that the vertical line register 113 is incremented from 0 to 261, and then back to 0 due to a vertical decoder 117 reset signal. Thus the field rate is 16.68 milliseconds.

For use in a PAL system, the input clock 77 is a 17.773 MHz clock. This clock is divided by 2.5 for a video clock rate of 7.09 MHz. Further reduction results in a sound clock rate of 3.54 MHz, a mixing clock rate of 1.77 MHz rate, and a pointer clock rate of 887 KHz. This clock scheme results in a 64.2 milliseconds line rate. For a PAL system the horizontal counter 89 is identical to the NTSC counter, 456 counts. However, PAL televisions require 312 raster scan lines per screen. The invention therefore has a register bit which enables these additional lines when set. Upon power-up the circuit will come up in PAL mode.

SIN-COS GENERATION: The generation of a color signal acceptable to a standard television requires the availability of reference Sine, $\overline{\text{Sine}}$, Cosine, and $\overline{\text{Co}}$ $\overline{\text{sine}}$ signals oscillating about the color burst frequency, as an output from the video output generator 101. For a NTSC system, that burst frequency is 3.57 MHz. It is this frequency that determined the input frequency of the chip from clock 77 to be 14.31 MHz. To achieve the color burst frequency, and all of the necessary 90 degree phase shifted signals, the 14.31 MHz clock is first divided by 2 to square up the signals, then again divided by 2 to obtain the proper color burst frequency, as well as achieve the 90 degree phase shift needed between the sine and cosine signals. Proper buffering and inverting of these 2 signals results in the four signals and the 90 degree phase relationship between them. The square waves are then integrated twice, first to achieve a triangular wave and then to achieve the sinusoid. The sinusoids are then capacitor coupled to prevent DC offset and buffered with an operational amplifier producing the 4 reference signals needed for color generation. The sinusoids are then selected, based on the 4 color code bits, in various degrees for color phase relationships. Due to the 4 bit color code, 16 colors are achieved.

KEYBOARD LATCH: The keyboard scan consists of an 8 bit port 139 dedicated to receiving the keyboard input. Data is latched into a keyboard register including decoder 141 from these ports during a "write" to this register, and is transferred to the data bus when the register is read. Included in this port is an internal pullup to drive the keyboard column lines.

CURSOR: A hardware cursor consists of a ten bit cursor compare register in the array 113 which compares the video matrix RAM 121 location with the contents of the cursor register in the array 113. During standard character display, for a positive cursor compare, a signal called "CRSR" is generated. "CRSR" is then gated with the overflow of a five bit blink register 103. This resulting signal "blinks" at a rate of 2 Hz. Each blink consists of the pixels defined by the foreground color switching to the background color and, conversely, the pixels defined by the background color switched to foreground color. Hardware cursor occurs only during standard character mode.

FLASH: Another hardware feature that pertains only to standard character mode is flash. Flash is selected on a character by character basis. The most significant bit of the attribute ram 125 determines if a character will flash. Flash is defined by turning the foreground color off leaving the entire character location at the background color. This flashing occurs at a 2 Hz rate.

COLOR REGISTER: There are 5 distinct 7 bit color registers 129 which, besides the attribute byte selected during the attribute RAM 125 read cycle, supply color and luminance information in various graphic modes. These registers 129 are:
Background Register 0
Background Register 1
Background Register 2
Background Register 3
Exterior Color Register The exterior color register contains the color code and luminance bit patterns for the border color, selected during blanking and outside the character display window. The background registers contain color code and luminance bit patterns that are selected depending on the character or graphic mode in which the chip is operating. The 5 color register select decoders 131 each selects the particular color source depending on the display mode being utilized and the display bit pattern.

The following description of the various character and graphic modes describes the color source and addressing scheme of reading dot data during each display mode.

CHARACTER DISPLAY MODE: In the standard character display mode, character pointers are read from the video matrix memory 21 and translated into character dot location addresses in a 1024 byte character base area of memory 121. The video matrix is comprised of 1000 consecutive locations in memory 121 which each contain an eight bit character pointer. The location of the video matrix within memory 121 is defined by the video matrix base register bits which are used as the 5 most significant bits (MSB) of the video matrix address. The lower order 10 bits are provided by the internal video matrix counter which steps through the 1000 character locations.

The eight bit character pointer can be interpreted in two different manners. Setting the MSB of the exterior register to a 0, the pointer can be used to define the standard character set in reverse video. If the pointer =1 the character is displayed in reverse, if the pointer =0 the standard character is displayed. 128 different character locations are available. Setting the MSB of the exterior register to a "1" turns the revers video feature off and allows the pointer to be used as a character pointer. This permits up to 256 different character definitions to be available simultaneously.

Each character is an 8×8 dot matrix stored in the character ROM as eight consecutive bytes. The location of the character memory is defined by an address word which is used for the 5 most significant bits of the character base address. The 11 lower order addresses are formed by the 8 bit character pointer from the video matrix memory 121 which selects a particular character, and a 3 bit vertical sub counter which selects one of the eight character bytes. The resulting characters are formatted as 25 rows of 40 characters each. In addition to the eight bit character pointer, an 8-bit color byte is associated with each video matrix location. The lower 4 bits of this attribute byte define 1 of 16 colors for each character. Bits 4–6 determine luminance level. There are 8 possible luminance levels/color. Bit 7 determines whether the character is to be displayed flashing at a 2 HZ rate.

STANDARD CHARACTER MODE: In the standard character mode, the character display is an 8 (horizontal)×8 (vertical) dot character location. Eight sequential bytes from the character base are displayed directly on the eight lines in each character region. A "0" bit causes a background color to be displayed while the color selected by the four least significant bits of the attribute byte, is to be displayed for a "1".

Each character has a unique color determined by the attribute byte while all characters share a common background color.

MULTICOLOR CHARACTER MODE: Multicolor mode provides additional color flexibility allowing up to four colors within each character, but with reduced resolution. The multicolor mode is selected by setting the multicolor bit to a "1", which causes the dot data to be interpreted in a different manner. If bit three of the attribute memory 125 byte is a "0", the character will be displayed as in standard character mode, allowing the two modes to be intermixed (however, only the lower eight colors are available). When the third bit of the attribute byte is a "1" the character bits are interpreted in the multicolor mode. Since two bits are required to specify one dot color, the character is now displayed as a four by eight matrix with one dot twice the horizontal size as in the standard character mode. However, each character region can now contain four different colors.

EXTENDED COLOR MODE: The extended color mode allows the selection of individual background colors for each character region with eight by eight character resolution. The character dot data is displayed as in the standard mode (foreground color and luminance is determined by the attribute byte for a "1" data bit), but the two MSB of the character pointer are used to select the background color for each character region. Since the two MSB of the character pointers are used for color information, only the first sixty-four character definitions are available. With extended color mode each character has one of sixteen individually defined foreground colors and one of four available background colors.

BIT MAP MODE: In the bit map mode, data is read from memory so that a one to one correspondence exists between each displayed dot and memory bit. The bit map mode provides a screen resolution of 320 (horizontal)×200 (vertical) individually controlled display dots. The video matrix is still accessed, but the data is no longer interpreted as character pointers, but rather as color data. The video matrix counter is used as an address to read the dot data for display from the display base. The memory address is formed by combining the three bit mapped mode base register as the MSB of the dot data address, with the ten bit video matrix counter, and the three bit raster counter as the three least significant bits. This addressing results in each eight sequential memory locations being formatted as an 8×8 dot block on the video display.

When standard bit map mode is in use, the color information is derived only from the data stored in the video matrix, which allows for two colors to be independently selected in each 8×8 block. When a bit in the display memory is a "0" the color of the output dot is set by the color selected by the background register. Similarly, a "1" selects the output color determined by foreground register 0.

MULTICOLOR BITMAP MODE: Multicolor bit map mode uses the same memory access sequence as standard bit map mode, but interprets the dot data differently. Again, as two bits are used to select one dot color, the horizontal dot size is doubled, resulting in a screen resolution of 160 (horizontal)×200 (vertical) dots. Utilizing multicolor bitmap mode, four independently selected colors can be displayed in each 8×8 block.

SCREEN BLANKING: The display screen may be blanked by setting the blank bit. When the screen is blanked, the entire screen will be filled with the exterior color found in the exterior color register. Process or throughput is increased when in blanking by doubling the system clock frequency.

ROW/COLUMN SELECT: The normal display consists of 25 rows of 40 character locations. For special display purposes, the display window may be reduced to 24 rows and 38 characters. There is no change in the format of the displayed information, except that characters (bits) adjacent to the exterior border area will now be covered by the border. Selecting a "0" enables a 24 row display, while a "1" enables 25 rows. Equally a "0" in the horizontal select bit allows for 38 columns, and a "1" enables 40 columns. The smaller display window is normally used in conjunction with scrolling.

SCROLLING: The display data may be scrolled up to one entire character space in either the horizontal or vertical direction. When used in conjunction with the smaller display window, scrolling can be used to create a smooth panning motion of display data. In the vertical direction, for a normal 25 row display the vertical scroll register should be set to 3. During vertical scroll the 24 row select is invoked and a 0 in the vertical scroll register for a display with no scroll. For each incrementation of the vertical scroll register there is a corresponding 1 pixel shift. For scroll in the horizontal direction, the 38 column select is invoked and the horizontal scroll register is set to a 0 for no pixel shift. Again, each increment of the register results in a 1 pixel shift in the screen. For no scroll the register is 0.

FREEZE: A freeze register bit is available. Freeze is not used during normal operation of the video, and it should therefore be initialized to a "0". Upon freeze the entire operation of the chip is suspended by "freezing" the horizontal counter. The set-reset decodes of the horizontal counts are reset.

RASTER REGISTER: The raster register can be interrogated to implement display changes outside the visible area to prevent display flicker. A write to the raster register is latched for use in an internal raster compare. When the current raster matches the written value, the raster interrupt latch is set. This register can be read and written to.

HORIZONTAL COUNT REGISTER: This read/write register contains the count of the horizontal counter. For testing purposes, writing to the register allows a forced value to be loaded into the horizontal counter.

VERTICAL LINE REGISTER: This register contains the current raster line that is displayed. This register can be read and written. A write to this register also facilitates testing since the raster line value can be forced to any state. The vertical line register is a nine bit register therefore occupying two bytes in the memory map.

As changes can be made in the above structure and operation of the invention, without departing from the intent and scope thereof, the above disclosure is to be read as illustrative and not to be interpreted in the limiting sense.

What is claimed is:

1. A programmable audio and video display driver circuit, as connected to a video game/home computer, is capable of driving a color television type audio/video display, independently of the video game/home computer main circuitry, comprising:

a bus architecture for transfering data and instructions;
a microprocessor connected to said bus architecture;
at least one read-only memory (ROM) connected to said bus architecture and able to receive address instructions and supply data thereto;

at least one dynamic random access memory (RAM) connected to said bus architecture and able to receive and supply data and instructions thereto;

at least one Schottky-type driver circuit connected to drive said random access memory under address instructions from said microprocessor through said bus architecture connection;

keyboard means;

a joy stick input connected to said microprocessor;

a source of software instructions connected to input a program to said microprocessor; and an interface circuit connected to said bus architecture to receive and send data and instructions from said microprocessor and connected to said keyboard means, said interface circuit being connected to supply signals to each said Schottky driver and to each said RAM and to receive signals from each said RAM, said interface circuit providing audio and video display signals usuable by said color television type display and wherein interface circuit contains therein a two-speed clock and a three oscillator voice generator.

2. The display driver circuit of claim 1 wherein said microprocessor is an 8 bit word microprocessor; wherein said at least one ROM is a pair of 16K, 8 bit word, ROMs each connected to said bus architecture; wherein said at least one RAM is a pair of RAMs each connected to said bus architecture; and wherein said at least one Schottky-type driver circuit is a pair of Schottky-type driver circuits, connected to a first one of said pair of RAMs.

3. The display driver circuit of claim 2 wherein said keyboard means includes a keyboard having a decoder, said keyboard decoder output being connected to said interface circuit; wherein said second of said pair of RAMs is connected in series with said first RAM of said pair; wherein said second of said pair of ROMs is connected in series with said first ROM of said pair; wherein each of said pair of Schottky-type driver circuits is connected to said interface circuit; wherein said microprocessor is programmable having a software input; wherein each of said pair of RAMs is connected to said interface circuit; and wherein said interface circuit includes commercial television type audio and video signal outputs.

4. The display driver circuit of claim 3 wherein said interface circuit includes:

a data port connectable to said bus architecture;

an address port connectable to said bus architecture;

a keyboard port connectable to said bus architecture;

a data transmissions line connected to said data port and said keyboard port;

an address transmission line connected to said keyboard port;

a control signal transmission line connected to said address port;

a plurality of operation registers connected to said address transmission line;

a random access memory (RAM) connected to said data transmission line, said control signal transmission line and said plurality of operation registers;

a sound generator connected to said plurality of operation registers;

a television video synchronous luminance (SYNC-LUM) and chrominance (CHROM) signal generator connected to said data transmission line and said control signal transmission line;

a NTSC/PAL selectable signal controller connected to said control signal transmission line; and a chip timing control circuit connected to each of said RAM, plurality of operation register, said sound generator and said SYNC-LUM and CHROM generator.

5. A programmable interface controller circuit for an audio and video display driver circuit, which is to provide audio and video information to a commercial television type display, to display video game/home computer information, said driver circuit being connected as part of a video game/home computer and having as a portion thereof, apart from said computer's arithmetic microprocessor and other circuitry, its own microprocessor, memory, information buses, user input and software input, comprising:

means, connected to said driver circuit microprocessor and memory, for programmably setting a voice, said voice being a mix of three different frequency generators as a part thereof, two of which providing square wave signals and the third being selectable between a square wave and white noise;

means, connected to said voice setting means, for generating video color character and high resolution color graphics display signals according to program instructions received;

means, connected to said driver cirucit information buses and memory, for providing control if said information buses and said memory; and input/output connections means for connecting said voice setting means and said video color character and graphics generating means to a commercial television type display.

6. The programmable interface controller circuit for the audio and video display driver circuit of claim 5 wherein said programmably setting voice means includes:

a plurality of sound instruction word reload registers, a voice instructions word reload register, a plurality of sound active instruction word registers and a noise active instruction word register comprising a sound section register array, said sound section register array being loadable from a bus connection;

an audio address decoder connected to said sound section register array and being addressable from a bus connection;

a voice register being loadable from a bus connection; and an audio mixer connected to said sound section register array and said voice register, said mixer including said two square wave generators and said selectable square wave/white noise generator.

7. The programmable interface controller circuit for the audio and video display driver circuit of claim 6 wherein said video color character and color graphics signals generating means includes:

a clock;

a plurality of timers connected to said clock;

a first multiplex circuit connected to said plurality of timers;

a horizontal dot counter connected to said first multiplex circuit;

a horizontal address decoder addressable from a bus connection;

a horizontal register connected to said horizontal dot counter and said horizontal address decoder;

a plurality of registers forming a video section register for refresh word, master word, cursor word, comparator word, video matrix word, video matrix reload word and vertical line word;

a vertical address decoder addressable from a bus connection and connected to said video section register array;

a first address decoder addressable from a bus connection;

a vertical blink register loadable from a bus connection and connected to said first address decoder;

a vertical register 3 bit counter connected to said first address decoder and said vertical blink register;

a second multiplex circuit connected to said video section register array, to said vertical blink register, to said vertical register 3 bit counter and to said sound section register array;

a horizontal display decoder connected to said horizontal register;

a vertical line counter connected to said second multiplex circuit and said horizontal display decoder;

a vertical line driver connected to said vertical line counter;

a vertical display decoder connected to said vertical line decoder; and video horizontal and vertical generator means including vertical scroll and horizontal scroll control circuit means and color selection means connected to said horizontal display decoder and to said vertical display decoder.

* * * * *

UNITED STATES PATENT AND TRADEMARK OFFICE
CERTIFICATE OF CORRECTION

PATENT NO. : 4,569,019

DATED : Feb. 4, 1986

INVENTOR(S) : D.W. DiOrio, Bruce F. Ahrens, R.J. Raible and C.E. Yang

It is certified that error appears in the above-identified patent and that said Letters Patent is hereby corrected as shown below:

Col 12 line 27: after "control" change "if" to - - of - -.

Signed and Sealed this

First Day of July 1986

[SEAL]

Attest:

DONALD J. QUIGG

Attesting Officer

Commissioner of Patents and Trademarks